(12) United States Patent
Kim et al.

(10) Patent No.: US 9,363,808 B2
(45) Date of Patent: Jun. 7, 2016

(54) METHOD AND APPARATUS FOR CONTROLLING INTER-CELL INTERFERENCE

(71) Applicant: LG ELECTRONICS INC., Seoul (KR)

(72) Inventors: Hak Seong Kim, Anyang-si (KR); Han Byul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 40 days.

(21) Appl. No.: 14/360,096

(22) PCT Filed: Nov. 23, 2012

(86) PCT No.: PCT/KR2012/009994
§ 371 (c)(1),
(2) Date: May 22, 2014

(87) PCT Pub. No.: WO2013/077678
PCT Pub. Date: May 30, 2013

(65) Prior Publication Data
US 2014/0314042 A1  Oct. 23, 2014

Related U.S. Application Data

(60) Provisional application No. 61/563,533, filed on Nov. 23, 2011, provisional application No. 61/676,344, filed on Jul. 27, 2012, provisional application No. 61/678,629, filed on Aug. 1, 2012, provisional application No. 61/679,082, filed on Aug. 3, 2012.

(51) Int. Cl.
*H04W 4/00* (2009.01)
*H04W 72/04* (2009.01)
(Continued)

(52) U.S. Cl.
CPC ........... *H04W 72/042* (2013.01); *H04L 1/0072* (2013.01); *H04L 5/001* (2013.01); *H04L 5/0053* (2013.01); *H04L 27/261* (2013.01); *H04W 72/082* (2013.01); *H04L 1/1829* (2013.01)

(58) Field of Classification Search
CPC .............................. H04W 4/00; H04W 72/042
USPC .................................. 370/328–339; 455/452
See application file for complete search history.

(56) References Cited

U.S. PATENT DOCUMENTS

| | | | |
|---|---|---|---|
| 8,576,792 B2 * | 11/2013 | Kim | H04L 1/1819 370/328 |
| 2011/0136494 A1* | 6/2011 | Kim | H04W 72/0426 455/450 |
| 2013/0295949 A1* | 11/2013 | Seo | H04J 11/005 455/452.1 |

FOREIGN PATENT DOCUMENTS

| KR | 10-2010-0115653 | 10/2010 |
|---|---|---|
| KR | 10-2011-0086470 | 7/2011 |

(Continued)

OTHER PUBLICATIONS

Intel Corporation (UK) Ltd, "Non-CA based PDCCH Interference Mitigation in LTE-A," 3GPP TSG RAN WG1 Meeting #61, R1-102814, May 2010, 7 pages.
PCT International Application No. PCT/KR2012/009994, Written Opinion of the International Searching Authority dated Feb. 28, 2013, 1 page.

(Continued)

*Primary Examiner* — Iqbal Zaidi
(74) *Attorney, Agent, or Firm* — Lee, Hong, Degerman, Kang & Walmey; Jonathan Kang; Michael Monaco

(57) ABSTRACT

Provided are a method and an apparatus for controlling inter-cell interference in a wireless communication system. A first cell receives control information related to the configuration of a downlink control channel from a second cell, and the first cell determines a transmission resource of the downlink control channel in accordance with the control information.

8 Claims, 13 Drawing Sheets

(51) Int. Cl.
  *H04L 5/00* (2006.01)
  *H04L 1/00* (2006.01)
  *H04W 72/08* (2009.01)
  *H04L 27/26* (2006.01)
  *H04L 1/18* (2006.01)

(56) References Cited

FOREIGN PATENT DOCUMENTS

| WO | 2011/005537 | 1/2011 |
| WO | 2011/052663 | 5/2011 |

OTHER PUBLICATIONS

Apple Inc., "On the Structure and Usage Scenarios of ePDCCH," 3GPP TSG RAN WG1 Meeting #67, R1-114300, Nov. 2011, 9 pages.
CATT, "Design of enhanced PDCCH in Rel-11," 3GPP TSG RAN WG1 Meeting #66, R1-112119, Aug. 2011, 4 pages.
LG Electronics, "Considerations on interference coordination in heterogeneous networks," 3GPP TSG RAN WG1 Meeting #59bis, R1-100236, Jan. 2010, 5 pages.
Korean Intellectual Property Office Application Serial No. 10-2014-7014627, Office Action dated Jul. 20, 2015, 4 pages.

* cited by examiner

METHOD AND APPARATUS FOR CONTROLLING INTER-CELL INTERFERENCE

CROSS-REFERENCE TO RELATED APPLICATIONS

This application is the National Stage filing under 35 U.S.C. 371 of International Application No. PCT/KR2012/009994, filed on Nov. 23, 2012, which claims the benefit of U.S. Provisional Application Ser. Nos. 61/563,533, filed on Nov. 23, 2011, 61/676,344, filed on Jul. 27, 2012, 61/678,629, filed on Aug. 1, 2012, and 61/679,082, filed on Aug. 3, 2012, the contents of which are all hereby incorporated by reference herein in their entirety.

BACKGROUND OF THE INVENTION

1. Field of the Invention

The present invention relates to wireless communications, and more particularly, to a method and apparatus for coordinating an inter-cell interference in a wireless communication system.

2. Related Art

Long term evolution (LTE) based on $3^{rd}$ generation partnership project (3GPP) technical specification (TS) release 8 is a promising next-generation mobile communication standard. Recently, LTE-advanced (LTE-A) based on 3GPP TS release 10 supporting multiple carriers is under standardization.

As disclosed in 3GPP TS 36.211 V10.2.0 (2011-06) "Evolved Universal Terrestrial Radio Access (E-UTRA); Physical Channels and Modulation (Release 10)", a physical channel of 3GPP LTE/LTE-A can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

A coordinated multi-point (CoMP) transmission and reception technique is one of techniques introduced in a next-generation mobile communication system. How to coordinate an inter-cell interference is an important issue in this case.

Since the legacy PDCCH uses an interleaving parameter on a cell basis, a cell coordination cannot be performed in practice. Thus, randomization is used instead to ensure detection capability.

However, in case of a newly designed control channel, it may be difficult to sufficiently mitigate the inter-cell interference when using only the randomization.

SUMMARY OF THE INVENTION

The present invention provides a method and apparatus for coordinating an inter-cell interference to transmit and receive a downlink control channel.

In an aspect, a method for coordinating an inter-cell interference in a wireless communication system is provided. The method includes receiving, by a first cell, coordination information related to a configuration of a downlink control channel from a second cell, determining, by the first cell, a transmission resource of the downlink control channel on the basis of the coordination information, and transmitting, by the first cell, the downlink control channel.

The coordination information may include information on one or more physical resource blocks (PRBs) recommended to be used in transmission of the downlink control channel.

The coordination information may include information on one or more PRBs in which transmission power used by the second cell is less than or equal to a specific value.

The downlink control channel may be an enhanced physical downlink control channel (EPDCCH).

In another aspect, a base station in a wireless communication system includes a radio frequency (RF) unit configured to transmit and receive a radio signal, and a processor operatively coupled to the RF unit and configured to receive coordination information related to a configuration of a downlink control channel from a neighboring cell, determine a transmission resource of the downlink control channel on the basis of the coordination information, and transmit the downlink control channel.

A control channel can be prevented from deterioration of detection capability when an inter-cell interference occurs.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS) release 8 or 3GPP LTE-advanced (LTE-A) based on 3GPP TS release 10. However, this is for exemplary purposes only, and thus the present invention is also applicable to various wireless communication networks. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as the CI of the primary cell. It is assumed hereinafter that the CI of the primary cell is 0 and a CI of the secondary cell is allocated sequentially starting from 1.

Figure 1:
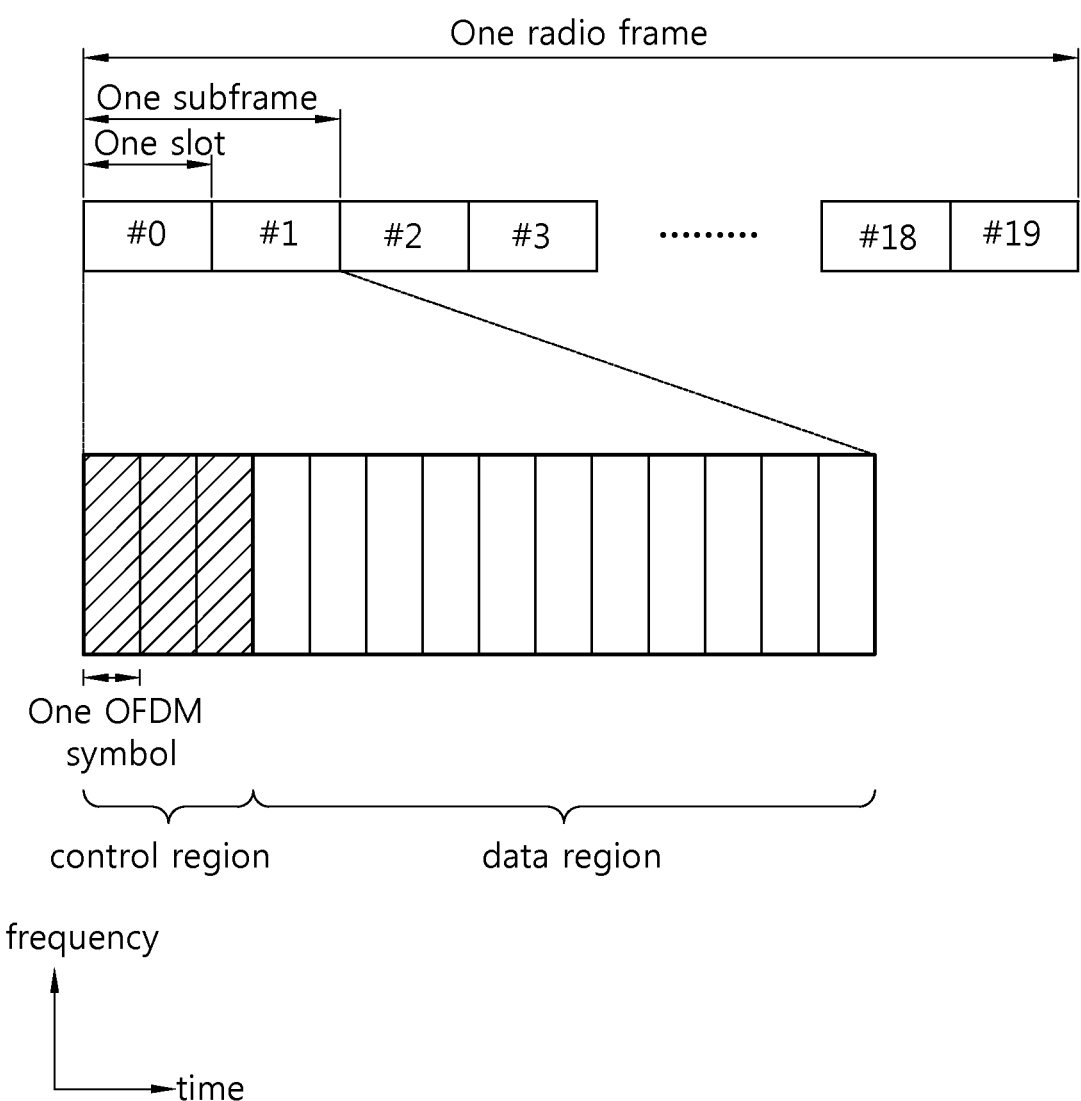
FIG. 1 shows a structure of a downlink (DL) radio frame in $3^{rd}$ generation partnership project (3GPP) long term evolution-advanced (LTE-A).

FIG. 1 shows a structure of a DL radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in multiple access schemes or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7 12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, examples of a physical control channel in 3GPP LTE/LTE-A include a physical downlink control channel (PDCCH), a physical control format indicator channel (PCFICH), and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Figure 2:
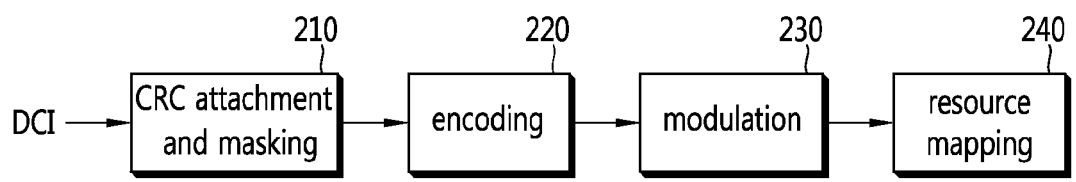
FIG. 2 is a block diagram showing a structure of a physical downlink control channel (PDCCH).

FIG. 2 is a block diagram showing a structure of a PDCCH.

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

A BS determines a PDCCH format according to DCI to be transmitted to a wireless device, attaches a CRC to control information, and masks a unique identifier (referred to as a radio network temporary identifier (RNTI)) to the CRC according to an owner or usage of the PDCCH (block 210).

If the PDCCH is for a specific wireless device, a unique identifier (e.g., cell-RNTI (C-RNTI)) of the wireless device may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the wireless device, a random access-RNTI (RA-RNTI) may be masked to the CRC. To indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data (block 220). Encoding includes channel encoding and rate matching.

The coded data is modulated to generate modulation symbols (block 230).

The modulation symbols are mapped to physical resource elements (REs) (block 240). The modulation symbols are respectively mapped to the REs.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set $\{1, 2, 4, 8\}$. Each element of the set $\{1, 2, 4, 8\}$ is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 3:
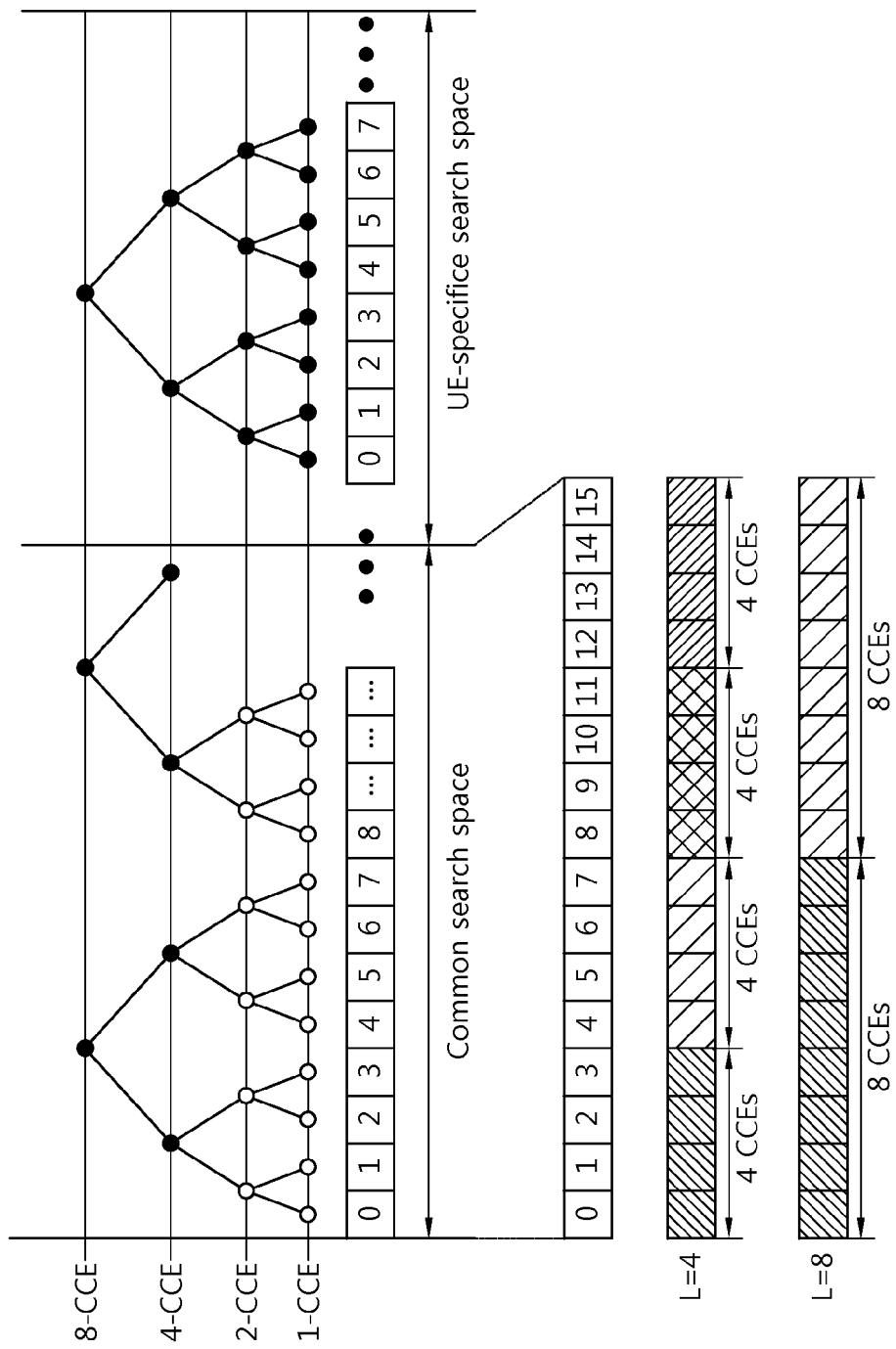
FIG. 3 shows an example of monitoring a PDCCH.

FIG. 3 shows an example of monitoring a PDCCH. The section 9 of 3GPP TS 36.213 V10.2.0 (2011-06) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of $\{4, 8\}$. However, a PDCCH (e.g., DCI formats 0, 1A) for carrying UE-specific information can also be transmitted in the common search space. The UE-specific search space supports a PDCCH having a CCE aggregation level of $\{1, 2, 4, 8\}$.

Table 1 shows the number of PDCCH candidates monitored by the wireless device.

TABLE 1

| Search Space Type | Aggregation level L | Size [in CCEs] | Number of PDCCH candidates | DCI formats |
|---|---|---|---|---|
| UE-specific | 1 | 6 | 6 | 0, 1, 1A, 1B, 1D, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level L∈$\{1, 2, 3, 4\}$, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k + m') \bmod \lfloor N_{CCE,k}/L \rfloor\} + i \quad \text{[Equation 1]}$$

Herein, i=0, 1, ..., L-1, m=0, ..., $M^{(L)}$-1, and $N_{CCE,k}$ denotes the total number of CCEs that can be used for PDCCH transmission in a control region of a subframe k. The control region includes a set of CCEs numbered from 0 to $N_{CCE,k-1}$. $M^{(L)}$ denotes the number of PDCCH candidates in a CCE aggregation level L of a given search space.

If a carrier indicator field (CIF) is set to the wireless device, m'=m+$M^{(L)}n_{cif}$. Herein, $n_{cif}$ is a value of the CIF. If the CIF is not set to the wireless device, m'=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k = (A \cdot Y_{k-1}) \bmod D \quad \text{[Equation 2]}$$

Herein, $Y_{-1} = n_{RNTI} \neq 0$, A=39827, D=65537, k=floor($n_s/2$), and $n_s$ denotes a slot number in a radio frame.

When the wireless device monitors the PDCCH by using the C-RNTI, a search space and a DCI format used in monitoring are determined according to a transmission mode of the PDSCH. Table 2 below shows an example of PDCCH monitoring in which the C-RNTI is set.

TABLE 2

| Transmission mode | DCI format | search space | Transmission mode of PDSCH based on PDCCH |
|---|---|---|---|
| Mode 1 | DCI format 1A | common and UE specific | Single-antenna port, port 0 |
|  | DCI format 1 | UE specific | Single-antenna port, port 0 |
| Mode 2 | DCI format 1A | common and UE specific | Transmit diversity |
|  | DCI format 1 | UE specific | Transmit diversity |

TABLE 2-continued

| Transmission mode | DCI format | search space | Transmission mode of PDSCH based on PDCCH |
|---|---|---|---|
| Mode 3 | DCI format 1A | common and UE specific | Transmit diversity |
|  | DCI format 2A | UE specific | CDD(Cyclic Delay Diversity) or Transmit diversity |
| Mode 4 | DCI format 1A | common and UE specific | Transmit diversity |
|  | DCI format 2 | UE-specific | Closed-loop spatial multiplexing |
| Mode 5 | DCI format 1A | common and UE specific | Transmit diversity |
|  | DCI format 1D | UE specific | MU-MIMO(Multi-User Multiple Input Multiple Output) |
| Mode 6 | DCI format 1A | common and UE specific | Transmit diversity |
|  | DCI format 1B | UE specific | Closed-loop spatial multiplexing |
| Mode 7 | DCI format 1A | common and UE specific | If the number of PBCH transmission ports is 1, single antenna port, port 0, otherwise Transmit diversity |
|  | DCI format 1 | UE specific | Single antenna port, port 5 |
| Mode 8 | DCI format 1A | common and UE specific | If the number of PBCH transmission ports is 1, single antenna port, port 0, otherwise, Transmit diversity |
|  | DCI format 2B | UE specific | Dual layer transmission (port 7 or 8), or a single antenna port, port 7 or 8 |

The usage of the DCI format is classified as shown in Table 3 below.

TABLE 3

| DCI format | Contents |
|---|---|
| DCI format 0 | It is used for PUSCH scheduling. |
| DCI format 1 | It is used for scheduling of one PDSCH codeword. |
| DCI format 1A | It is used for compact scheduling and a random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |
| DCI format 2 | It is used for PDSCH scheduling of UEs configured to a closed-loop spatial multiplexing mode. |
| DCI format 2A | It is used for PDSCH scheduling of UEs configured to a open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |

Figure 4:
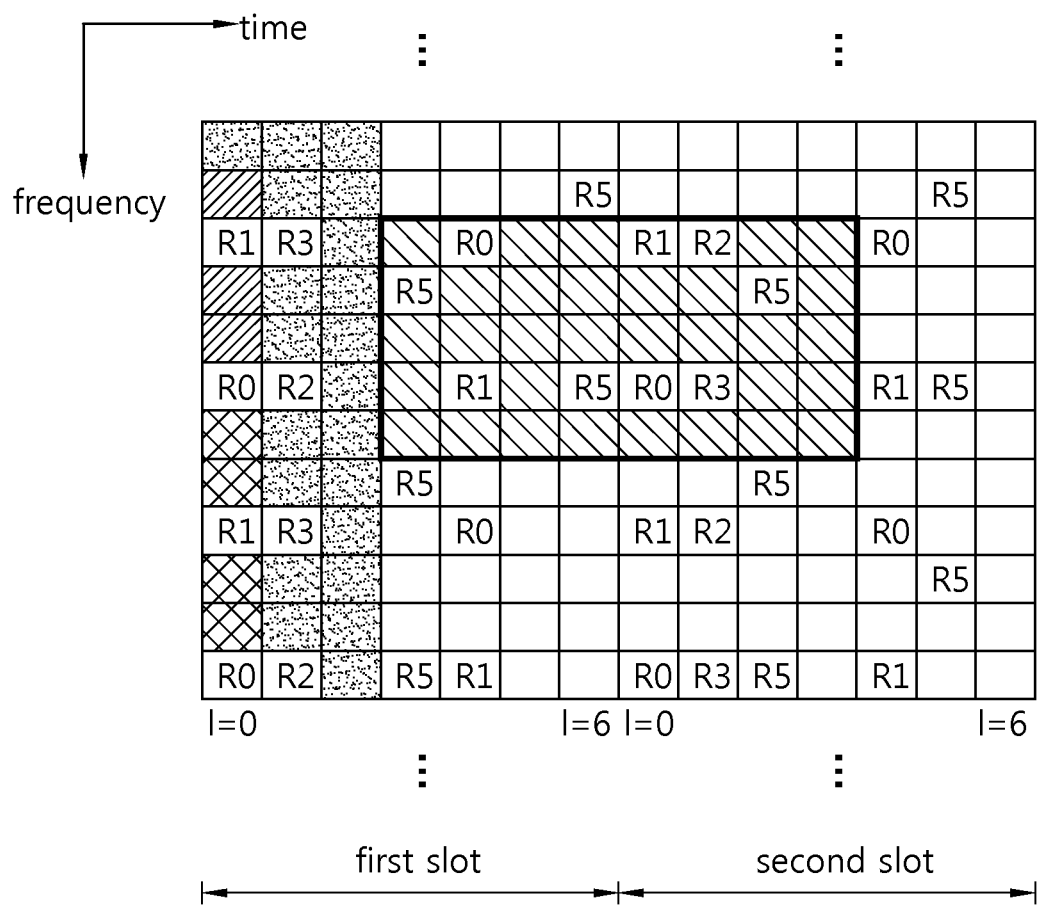
FIG. 4 shows an example of arranging a reference signal and a control channel in a DL subframe of 3GPP LTE.

FIG. 4 shows an example of arranging a reference signal and a control channel in a DL subframe of 3GPP LTE.

A control region (or a PDCCH region) includes first three OFDM symbols, and a data region in which a PDSCH is transmitted includes the remaining OFDM symbols.

A PCFICH, a PHICH, and/or a PDCCH are transmitted in the control region. A control format indictor (CFI) of the PCFICH indicates three OFDM symbols. A region excluding a resource in which the PCFICH and/or the PHICH are transmitted in the control region is a PDCCH region which monitors the PDCCH.

Various reference signals are transmitted in the subframe.

A cell-specific reference signal (CRS) may be received by all wireless devices in a cell, and is transmitted across a full downlink frequency band. In FIG. 4, 'R0' indicates a resource element (RE) used to transmit a CRS for a first antenna port, 'R1' indicates an RE used to transmit a CRS for a second antenna port, 'R2' indicates an RE used to transmit a CRS for a third antenna port, and 'R3' indicates an RE used to transmit a CRS for a fourth antenna port.

An RS sequence $r_{l,ns}(m)$ for a CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

Herein, m=0, 1, . . . , $2N_{maxRB}-1$. $N_{maxRB}$ is the maximum number of RBs. ns is a slot number in a radio frame. l is an OFDM symbol index in a slot.

A pseudo-random sequence c(i) is defined by a length-31 gold sequence as follows.

$$c(n)=(x_1(n+Nc)+x_2(n+Nc)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 4]}$$

Herein, Nc=1600, and a first m-sequence is initialized as $x_1(0)=1, x_1(n)=0, m=1, 2, \ldots, 30$.

A second m-sequence is initialized as $c_{init}=2^{10}(7(ns+1)+1+1)(2N^{cell}_{ID}+1)+2N^{cell}_{ID}+N_{CP}$ at a start of each OFDM symbol. $N^{cell}_{ID}$ is a physical cell identifier (PCI). $N_{CP}=1$ in a normal CP case, and $N_{CP}=0$ in an extended CP case.

A UE-specific reference signal (URS) is transmitted in the subframe. Whereas the CRS is transmitted in the entire region of the subframe, the URS is transmitted in a data region of the subframe and is used to demodulate the PDSCH. In FIG. 4, 'R5' indicates an RE used to transmit the URS. The URS is also called a dedicated reference signal (DRS) or a demodulation reference signal (DM-RS).

The URS is transmitted only in an RB to which a corresponding PDSCH is mapped. Although R5 is indicated in FIG. 4 in addition to a region in which the PDSCH is transmitted, this is for indicating a location of an RE to which the URS is mapped.

The URS is used only by a wireless device which receives a corresponding PDSCH. A reference signal (RS) sequence $r_{ns}(m)$ for the URS is equivalent to Equation 3. In this case, m=0, 1, . . . , $12N_{PDSCH,RB}-1$, and $N_{PDSCH,RB}$ is the number of RBs used for transmission of a corresponding PDSCH. A pseudo-random sequence generator is initialized as $c_{init}=$ (floor(ns/2)+1)(2 $N^{cell}_{ID}+1$)$2^{16}+n_{RNTI}$ at a start of each subframe. $n_{RNTI}$ is an identifier of the wireless device.

The aforementioned initialization method is for a case where the URS is transmitted through the single antenna, and when the URS is transmitted through multiple antennas, the pseudo-random sequence generator is initialized as $c_{init}=$ (floor(ns/2)+1)(2 $N^{cell}_{ID}+1$)$2^{16}+n_{SCID}$ at a start of each subframe. $n_{SCID}$ is a parameter acquired from a DL grant (e.g., a DCI format 2B or 2C) related to PDSCH transmission.

The URS supports multiple input multiple output (MIMO) transmission. According to an antenna port or a layer, an RS sequence for the URS may be spread into a spread sequence as follows.

TABLE 4

| Layer | [w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

A layer may be defined as an information path which is input to a precoder. A rank is a non-zero eigenvalue of a MIMO channel matrix, and is equal to the number of layers or the number of spatial streams. The layer may correspond to an antenna port for identifying a URS and/or a spread sequence applied to the URS.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 5:
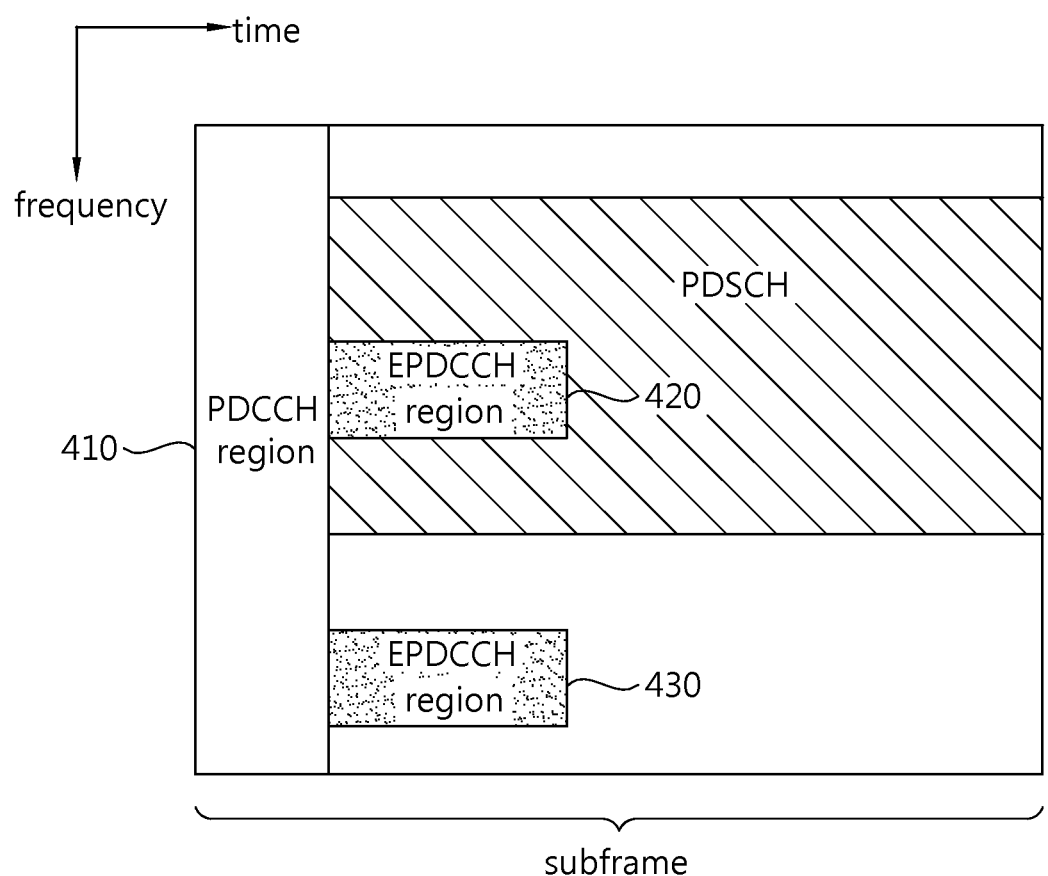
FIG. 5 is an example of a subframe having an enhanced PDCCH (EPDCCH).

FIG. 5 is an example of a subframe having an EPDCCH.

The subframe may include zero or one PDCCH region 410 and zero or more EPDCCH regions 420 and 430.

The EPDCCH regions 420 and 430 are regions in which a wireless device monitors the EPDCCH. The PDCCH region 410 is located in up to first four OFDM symbols of the subframe, whereas the EPDCCH regions 420 and 430 may be flexibly scheduled in an OFDM symbol located after the PDCCH region 410.

One or more EPDCCH regions 420 and 430 may be assigned to the wireless device. The wireless device may monitor EPDDCH data in the assigned EPDCCH regions 420 and 430.

The number/location/size of the EPDCCH regions 420 and 430 and/or information regarding a subframe for monitoring the EPDCCH may be reported by a BS to the wireless device by using a radio resource control (RRC) message or the like.

In the PDCCH region 410, a PDCCH may be demodulated on the basis of a CRS. In the EPDCCH regions 420 and 430, instead of the CRS, a DM-RS may be defined for demodulation of the EPDCCH. An associated DM-RS may be transmitted in the EPDCCH regions 420 and 430.

An RS sequence for the associated DM-RS is equivalent to Equation 3. In this case, m=0, 1, . . . , $12N_{RB}-1$, and $N_{RB}$ is a maximum number of RBs. A pseudo-random sequence generator may be initialized as $c_{init}=(\text{floor}(ns/2)+1)(2 N_{EPDCCH,ID}+1)2^{16}+n_{EPDCCH,SCID}$ at a start of each subframe. ns is a slot number of a radio frame. $N_{EPDCCH,ID}$ is a cell index related to a corresponding EPDCCH region. $n_{EPDCCH,SCID}$ is a parameter given from higher layer signaling.

Each of the EPDCCH regions 420 and 430 may be used to schedule a different cell. For example, an EPDCCH in the EPDCCH region 420 may carry scheduling information for a primary cell, and an EPDCCH in the EPDCCH region 430 may carry scheduling information for a secondary cell.

When the EPDCCH is transmitted through multiple antennas in the EPDCCH regions 420 and 430, the same precoding as that used in the EPDCCH may be applied to a DM-RS in the EPDCCH regions 420 and 430.

Comparing with a case where the PDCCH uses a CCE as a transmission resource unit, a transmission resource unit for the EPDCCH is called an enhanced control channel element (ECCE). An aggregation level may be defined as a resource unit for monitoring the EPDCCH. For example, when 1 ECCE is a minimum resource for the EPDCCH, it may be defined as an aggregation level L={1, 2, 4, 8, 16}.

An EPDCCH search space may corresponds to an EPDCCH region. One or more EPDCCH candidates may be monitored at one or more aggregation levels in the EPDCCH search space.

Now, resource allocation for an EPDCCH will be described.

The EPDCCH is transmitted by using one or more ECCEs. The ECCE includes a plurality of enhanced resource element groups (EREGs). According to a CP and a subframe type based on a time division duplex (TDD) DL-UL configuration, the ECCE may include 4 EREGs or 8 EREGs. For example, the ECCE may include 4 EREGs in a normal CP case, and may include 8 EREGs in an extended CP case.

A physical resource block (PRB) pair is 2 PRBs having the same RB number in one subframe. The PRB pair is a first PRB of a first slot and a second PRB of a second slot in the same frequency domain. In the normal CP case, the PRB pair includes 12 subcarriers and 14 OFDM symbols, and thus includes 168 resource elements (REs).

Figure 6:
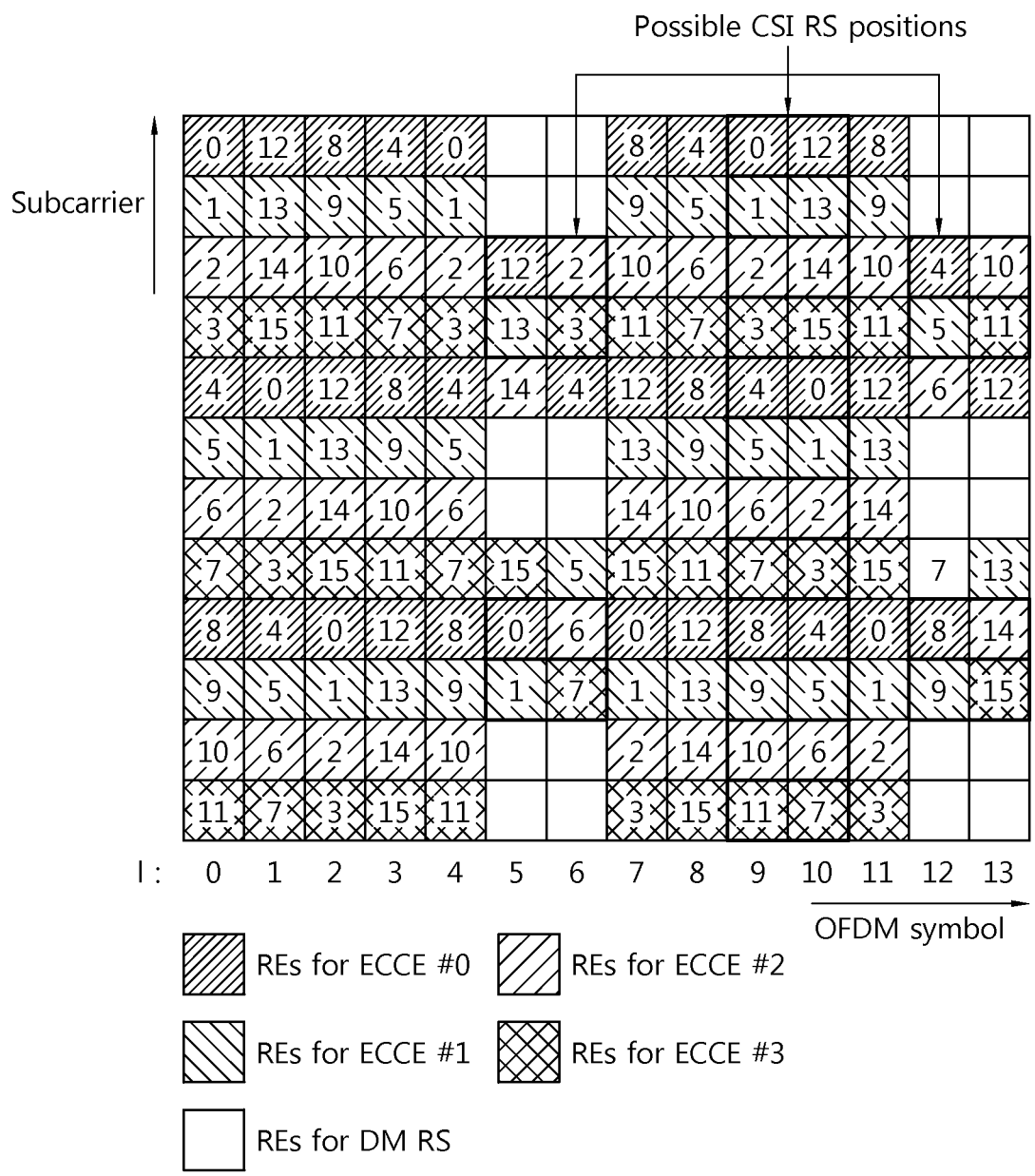
FIG. 6 shows an example of a physical resource block (PRB) pair.

FIG. 6 shows an example of a PRB pair. Although it is assumed hereinafter that a subframe includes 2 slots and a PRB pair in one slot includes 7 OFDM symbols and 12 subcarriers, the number of OFDM symbols and the number of subcarriers are for exemplary purposes only.

In one subframe, the PRB pair includes 168 REs in total. 16 EREGs are configured from 144 REs, except for 24 REs for a DM RS. Therefore, 1 EREG may include 9 REs. However, a CRS-RS or a CRS may be placed to one PRB pair, in addition to the DM RS. In this case, the number of available REs may be decreased, and the number of REs included in 1 EREG may be decreased. The number of REs included in the EREG may be changed, whereas there is no change in the number (i.e., 16) of EREGs included in one PRB pair.

In this case, as shown in FIG. 6, an RE index may be assigned sequentially starting from a first subcarrier of a first OFDM symbol (1=0). Assume that 16 EREGs are indexed from 0 to 15. In this case, 9 REs having an RE index 0 are assigned to an EREG 0. Likewise, 9 REs corresponding to an RE index k (k=0, . . . , 15) are assigned to an EREG k.

An EREG group is defined by aggregating a plurality of EREGs. For example, if an EREG group having 4 EREGs is defined, it may be defined as an EREG group #0={EREG 0, EREG 4, EREG 8, EREG 12}, an EREG group #1={EREG 1, EREG 5, EREG 9, EREG 3}, an EREG group #2={EREG 2, EREG 6, EREG 10, EREG 14}, and an EREG group #3={EREG 3, EREG 7, EREG 11, EREG 15}. If an EREG group having 8 EREGs is defined, it may be defined as an EREG group #0={EREG 0, EREG 2, EREG 4, EREG 6, EREG 8, EREG 10, EREG 12, EREG 14} and an EREG group #1={EREG 1, EREG 3, EREG 5, EREG 7, EREG 9, EREG 11, EREG 13, EREG 15}.

As described above, the ECCE may include 4 EREGs. In an extended CP case, the ECCE may include 8 EREGs. The ECCE is defined by the EREG group. For example, it is exemplified in FIG. 6 that an ECCE #0 includes an EREG group #0, an ECCE #1 includes an EREG group #1, an ECCE #2 includes an EREG group #2, and an ECCE #3 includes an EREG group #3.

ECCE-to-EREG mapping has two types of transmission, i.e., localized transmission and distributed transmission. In the localized transmission, an EREG group constituting one ECCE is selected from EREGs of one PRB pair. In the distributed transmission, an EREG constituting one ECCE is selected from EREGs of different PRB pairs.

Since the number of REs belonging to the EREG may be changed as described above, the number of REs constituting the ECCE may differ for each ECCE. For example, a CSI-RS may be transmitted in OFDM symbols with l=9, 10, and thus 2 REs are excluded in a certain ECCE, whereas 1 RE is excluded in another ECCE. As a result, the number of REs may be inconsistent between ECCEs. To reduce the inconsistency in the number of REs assigned to the ECCE, a cyclic shift of an RE index is taken into account.

Figure 7:
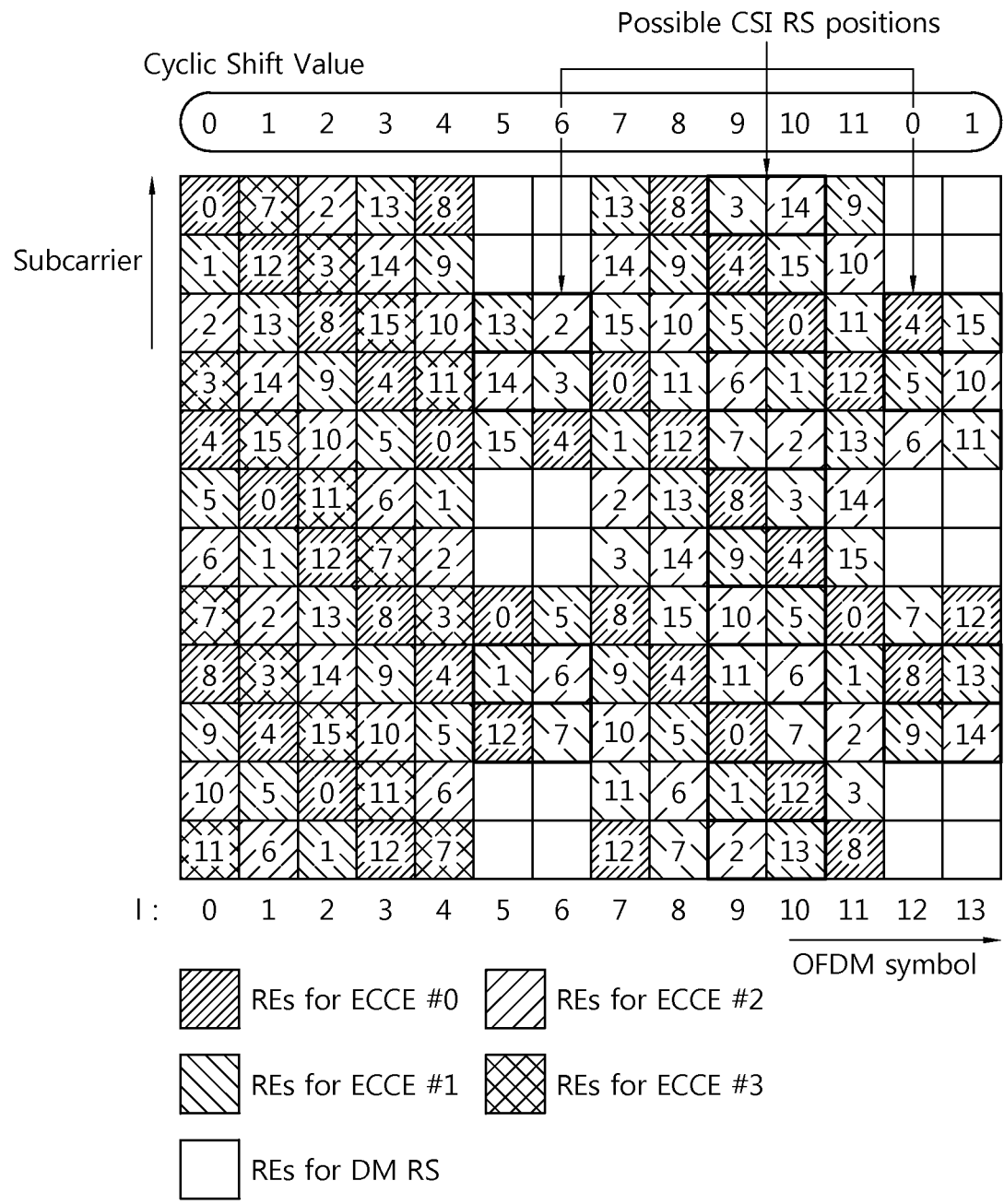
FIG. 7 shows an example of a PRB pair to which a cyclic shift is applied.

FIG. 7 shows an example of a PRB pair to which a cyclic shift is applied.

In an RE index arrangement of FIG. 7, an index of REs belonging to the same OFDM symbol is shifted by a cyclic shift value. For example, an RE index is cyclically shifted by 1 from an OFDM symbol with an index l=1, and an RE index is cyclically shifted by 2 from an OFDM symbol with an index l=2. The cyclic shift value is for exemplary purposes only.

The cyclic shift value may be given based on an OFDM symbol index.

Now, a method of transmitting and receiving a control channel to mitigate an inter-cell interference will be described according to an embodiment of the present invention.

A coordinated multi-point (CoMP) transmission and reception technique is one of techniques introduced in a next-generation mobile communication system. This is a case where a wireless device simultaneously receives a service from a plurality of cells. An inter-cell interference is an important issue in this case.

Hereinafter, a CoMP UE is a wireless device to which the CoMP is applied, and a non-CoMP UE is a wireless device to which the CoMP is not applied.

The legacy PDCCH performs interleaving at an REG level, and uses an interleaving parameter on a cell basis. Therefore, a cell coordination cannot be performed in practice. Thus, randomization is used instead to ensure PDCCH capability. The 'randomization' implies that an RE set occupied by one PDCCH is shared by several PDCCHs instead of being allocated to one PDCCH from a perspective of a neighboring cell. That it, it means that, if a PDCCH is not transmitted in a specific RE set in one cell, an interference to another cell is decreased, and such an effect evenly has an effect on multiple PDCCHs which share a corresponding RE set, instead of having an effect only on one specific PDCCH.

However, in case of an E-DCCH based on a DM RS, it is difficult to sufficiently mitigate the inter-cell interference when using only the randomization.

The present invention proposes a method of mitigating the inter-cell interference by coordinating a radio resource (e.g., RE, EREG, ECCE, PRB, and/or PRB pair) to which the EPDCCH is mapped. For this, an EPDCCH interleaving parameter or mapping information may be exchanged between cells, or may be reported by each cell to the wireless device.

Hereinafter, a cell may include not only a physical cell but also a virtual cell. As described above, a cell ID is required to generate a DM RS. Multiple parameters may be input to acquire an RS having a specific characteristic. One of the parameters may have the same or similar effect of changing the cell ID. In this regard, a cell ID mentioned in the proposed method implies not only a physical cell identify (PCI) and a virtual PCI but also one or more input parameters for generating a desired signal.

Figure 8:
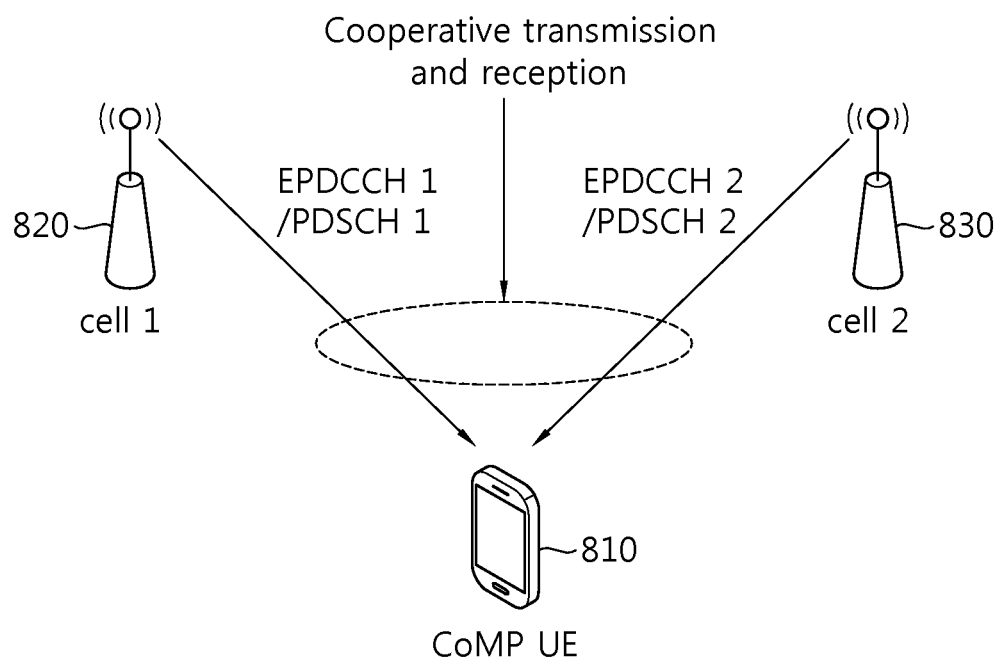
FIG. 8 shows an example of cooperative transmission and reception.

FIG. 8 shows an example of cooperative transmission and reception.

It is assumed that a CoMP UE 810 receives an EPDCCH1 and/or a PDSCH1 from a cell1 820, and also receives an EPDCCH2 and/or a PDSCH2 from a cell2 830 in the same subframe.

One of primary purposes of using the EPDCCH is to effectively coordinate an inter-cell interference in a situation where cells are densely distributed and thus the inter-cell interference is intensified. The CoMP UE 810 may be strongly interfered from the EPDCCH2 (or PDSCH2) of the cell2 830 when receiving the EPDCCH1 of the cell1 820.

Therefore, the EPDCCH cannot be effectively protected when an interference from a neighboring cell is simply randomized as in the legacy PDCCH.

Accordingly, a technique is required in which a mutual coordination is achieved between EPDCCHs of multiple cells so that resources are not transmitted in an overlapping manner as much as possible in the same time/frequency/spatial resource domain.

As one method for implementing this, a message may be sent to the CoMP UE to report that transmission/mapping/interleaving of the inter-cell coordinated EPDCCH is achieved. Exclusive EPDCCH resources may be allocated to avoid at least an EPDCCH collision at least between the CoMP UEs (or CoMP UE groups).

In addition, to reduce an interference between the CoMP UE and the non-CoMP UE, an EPDCCH resource of the non-CoMP UE may be prevented from overlapping with an EPDCCH resource of the CoMP UE. The distinctive EPDCCH resource may include an RE, an EREG, an EREG group, an ECCE, a PRB, and/or a PRB pair.

Interleaving may be required to perform an interference coordination among multiple CoMP UEs. An EPDCCH of another CoMP UE may be mapped to the RE, the EREG, and/or the ECCE which do not overlap with each other in the same EPDCCH resource (or PRB pair). The same search space may be configured between CoMP UEs requiring an interference coordination, and EPDCCH-to-RE mapping (or EPDCCH-to-ECCE mapping, EPDCCH-to-EREG mapping) may be performed according to the same rule in the same search space. In this case, different EPDCCH may be mapped to different REs. Since an EPDCCH for each CoMP UE is mapped to a non-overlapping RE, an interference can be minimized.

For an inter-cell interference coordination (ICIC), a search space may be configured in unit of a CoMP UE group. As to a UE belonging to the CoMP UE group, EPDCCH resource mapping may be performed according to the same rule. For example, an EREG may include the same number of REs, or may use the same aggregation level. An EPDCCH resource may be completely separated between different CoMP UE groups, or optionally, some of them may overlap with each other.

The same search space may be configured to a UE which intends to coordinate the EPDCCH resource. A BS may transmit an indicator indicating that predetermined resource mapping is used.

Figure 9:
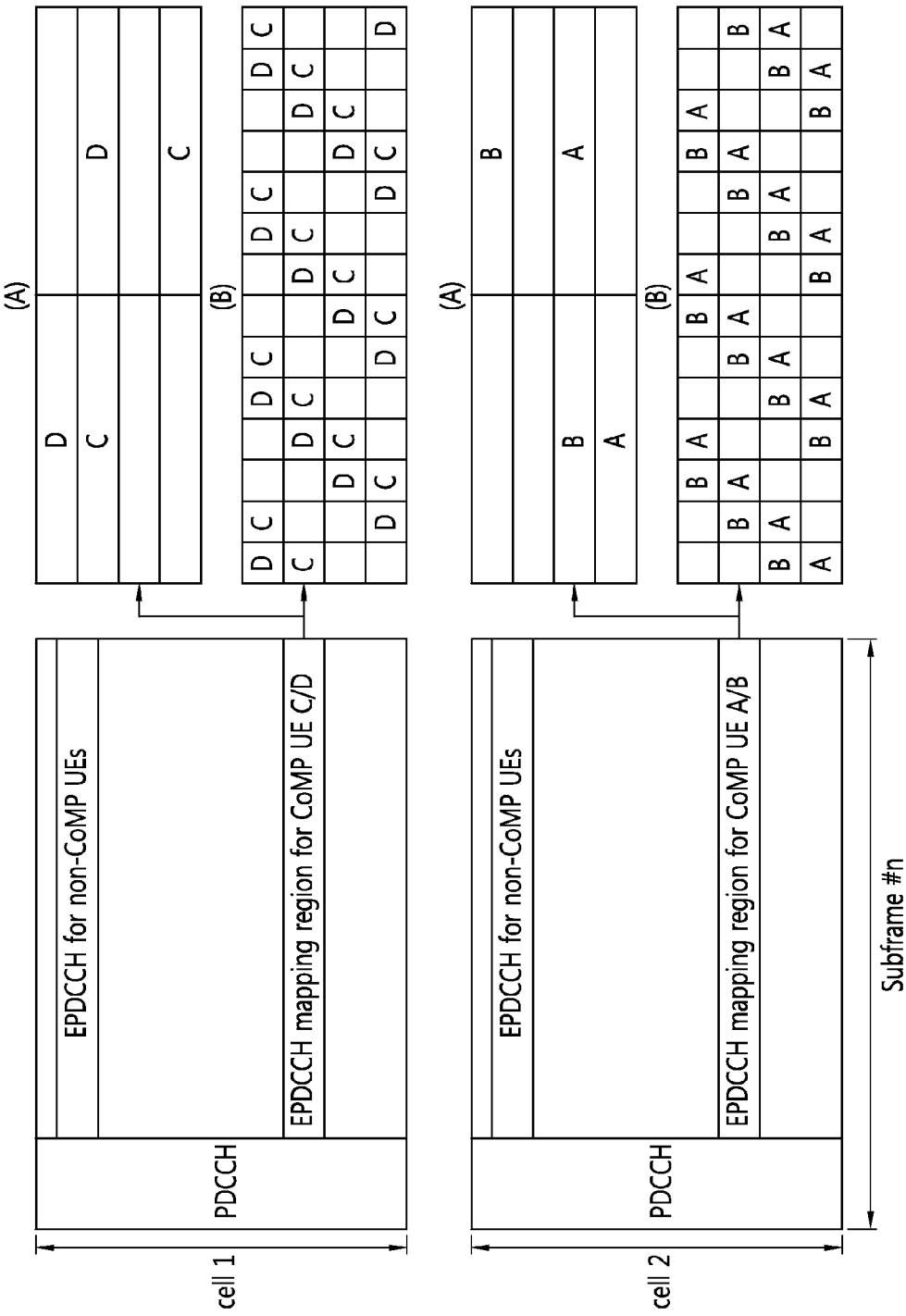
FIG. 9 shows an inter-cell interference coordination (ICIC) according to an embodiment of the present invention.

FIG. 9 shows an ICIC according to an embodiment of the present invention.

Assume that a CoMP UE A and a CoMP UE B are present in a cell 1, and a CoMP UE C and a CoMP UE D are present in a cell 2. The CoMP UEs A/B/C/D construct one CoMP UE group.

Assume that an EPDCCH search space for a CoMP UE group is defined in one PRB pair. Mapping (A) is an example in which an EPDCCH of CoMP UEs is configured to occupy different frequency domains (or different subcarriers) in a PRB pair. In addition, it may be configured to occupy different subcarriers in different slots. Mapping (B) is an example in which an EPDCCH of CoMP UEs is configured to occupy different REs (or RE sets) in a PRB pair.

In case of mapping (B), subcarriers belonging to a PRB are divided into 4 groups, and an EPDCCH of a CoMP UE is mapped one by one to each group. In this case, mapping is achieved in order of A->B->C->D in a first OFDM symbol, and mapping is achieved in order of D->A->B->C in a second OFDM symbol by cyclically shifting one by one. A mapping order may be cyclically shifted according to an OFDM symbol index or a slot index. Herein, a cyclic shift value may be set to 1 or may be set to a value greater than or equal to 1.

The mapping (A) and the mapping (B) show that a basic unit of configuring an EPDCCH resource is different. The mapping (A) or the mapping (B) is used herein since the same resource mapping is used in a CoMP UE group in a specific subframe. However, this does not mean that the mapping (A) and the mapping (B) are simultaneously used. A BS may report which mapping is used for a UE belonging to the CoMP UE group.

Even if different cells transmit the EPDCCH to the UE, resources thereof are separated, and thus an influence of the inter-cell interference can be significantly decreased.

If two cells perform an EPDCCH mapping rule equally in a specific EPDCCH (i.e., a PRB pair), an EPDCCH or an RE set occupied by the EPDCCH is identical in the two cells. Therefore, the EPDCCH may be assigned to the CoMP UE so that the two cells do not overlap with each other. A cell 1 may not assign an EPDCCH resource used for a CoMP UE A/B to a CoMP UE C/D, or may decrease transmission power of a corresponding portion.

Figure 10:
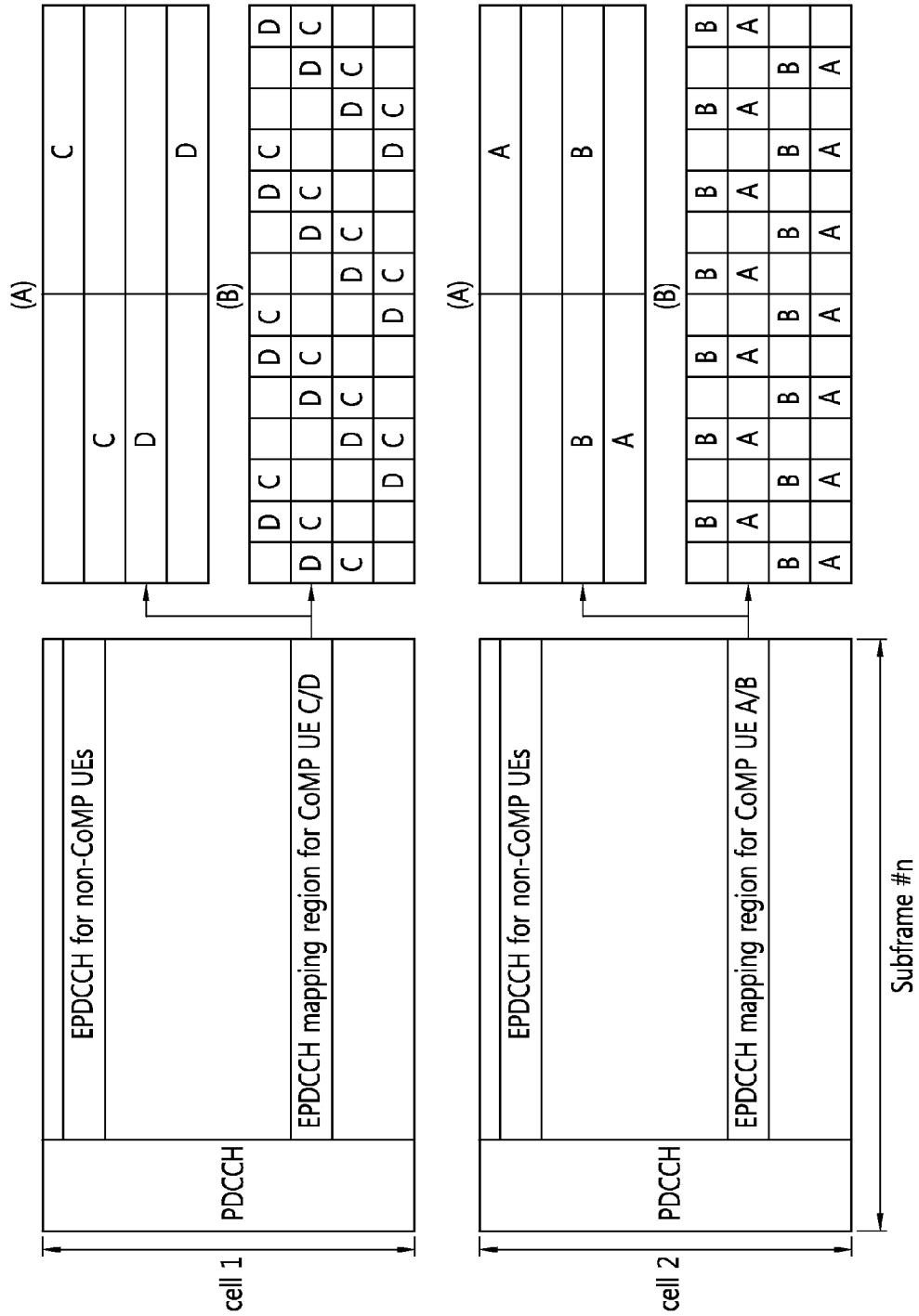
FIG. 10 shows EPDCCH mapping without an interference coordination.

FIG. 10 shows EPDCCH mapping without an interference coordination.

A cell 1 and a cell 2 use different EPDCCH mapping. In comparison with the embodiment of FIG. 8, an EPDCCH region of a CoMP UE A/B partially overlaps with an EPDCCH region of a CoMP UE C/D. Accordingly, there is a high possibility that an EPDCCH detection error occurs in an overlapping resource due to an inter-cell interference.

Such a method is not suitable for a case where an active interference coordination is performed as shown in the embodiment of FIG. 8, but may be suitable for a case where only a slow-level coordination is possible due to a limitation of backhaul link capacity between multiple cells, or the like. That is, the method may be suitable when a specific one cell discards EPDCCH transmission.

EPDCCH interleaving and/or resource mapping based on the aforementioned same rule may be applied to all UEs, or may be selectively applied only to a UE capable of benefiting from that. For example, the above method may be applied to a CoMP UE and may not be applied to a non-CoMP UE. A network may report whether to perform an interference coordination to each UE through signaling. For example, the EPDCCH mapping rule may be determined according to a cell ID (or a virtual cell ID). If a CoMP-based ICIC is required, the cell ID may be reported to the UE.

Whether to apply the ICIC may be determined according to a DCI format and/or a transmission mode of the UE. This is because a certain DCI format requires a strong interference coordination, whereas another DCI format may not require the interference coordination.

Now, it is proposed to exchange information related to an EPDCCH between neighboring cells to facilitate an ICIC for an EPDCCH.

Figure 11:
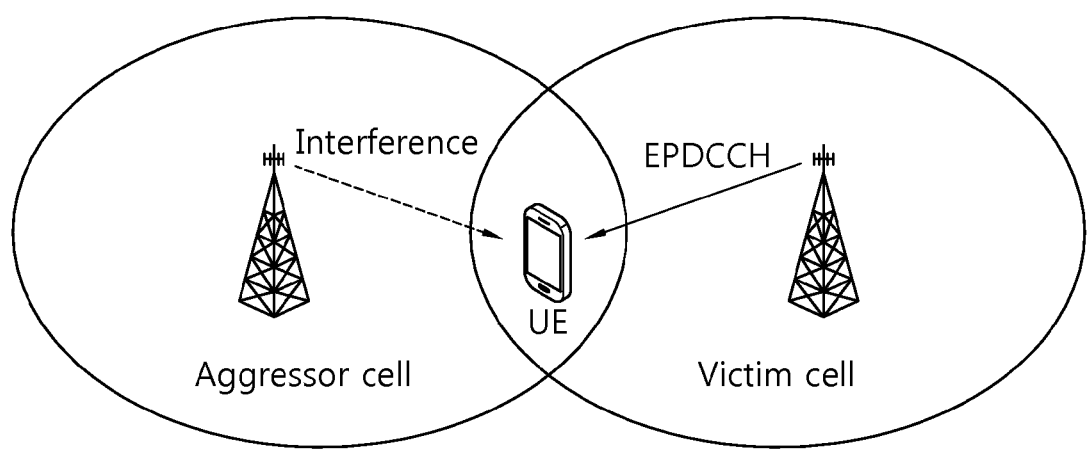
FIG. 11 shows an inter-cell interference situation.

FIG. 11 shows an inter-cell interference situation.

A victim cell is a cell which transmits an EPDCCH. An aggressor cell is a cell which causes an interference in the transmission of the victim cell. The victim cell may also be called a first cell, an interfered cell, or an EPDCCH transmission cell. The aggressor cell may also be called a second cell or an interfering cell. An interference coordination method is proposed to protect EPDCCH transmission of the victim cell.

First, the victim cell may report EPDDCH transmission related information to the aggressor cell.

The information may include information regarding a radio resource used in EPDCCH transmission (e.g., at least any one of a subframe, a PRB pair, an aggregation level, a scrambling sequence for a DM RS or a cell ID for the DM RS, and an EPDCCH-to-RE mapping pattern). The aggressor cell may coordinate its configuration to avoid a strong interference on the basis of the transmission related information. For example, if the EPDCCH is transmitted in a specific subframe, the aggressor cell may decrease transmission power in the specific subframe.

The victim cell may report, to the aggressor cell, information on a PRB set used in EPCCH transmission and/or a PRB set recommended to be used by the aggressor cell. The aggressor cell may transmit its EPDCCH and/or PDSCH by using the recommended PRB.

Next, the aggressor cell may report coordination information to the victim cell.

The coordination information may include information indicating a radio resource suitable to configure the EPDCH by the victim cell. The coordination information may include information on a radio resource (e.g., a subframe or a PRB) recommended to be used in EPDCCH transmission by the victim cell. Additionally or selectively, the coordination information may include information on a radio resource used with power less than or equal to specific transmission power by the aggressor cell.

In general, the EPDCCH uses a semi-static PRB, and consumes a long time (e.g., hundreds of ms) to change a location thereof. It is proposed to report to the victim cell about information on a PRB in which the aggressor cell maintains low transmission power for a relatively long time, so that the victim cell reliably configures the EPDCCH.

Figure 12:
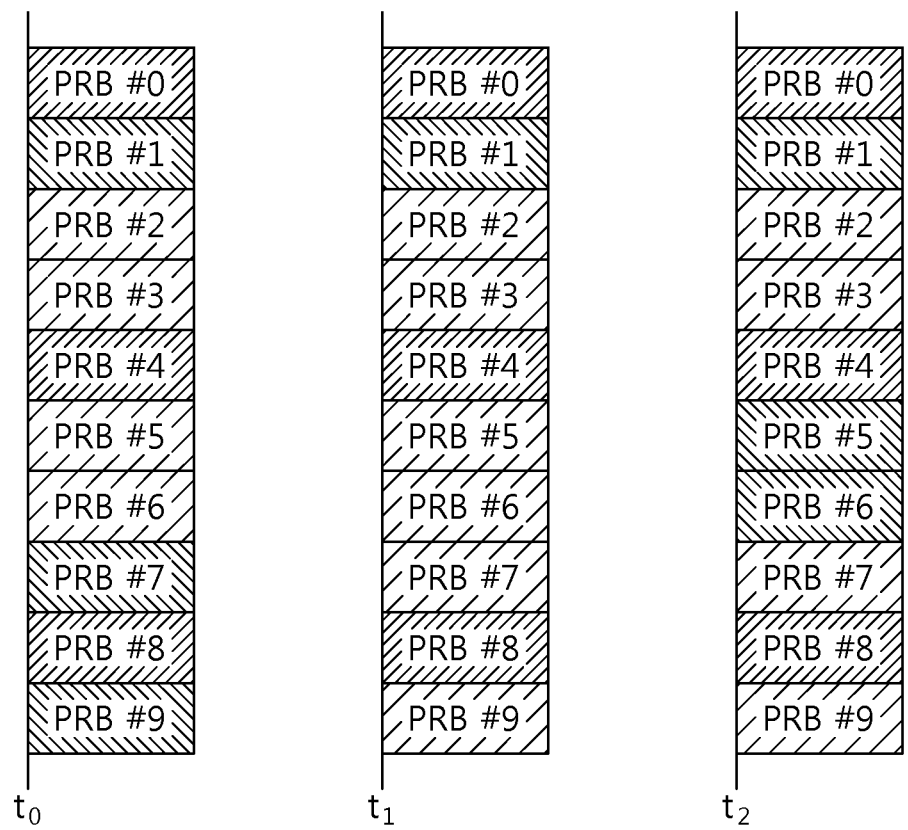
FIG. 12 shows an example of signaling for an interference coordination according to another embodiment of the present invention.

FIG. 12 shows an example of signaling for an interference coordination according to another embodiment of the present invention.

At time t0, it is assumed that an aggressor cell does not use PRBs #0, #4, #8 in transmission, PRBs #1, #7, #9 use low transmission power, and PRBs #2, #3, #5, #6 use high transmission power. The aggressor cell may transmit coordination information indicating {PRB #0, #4, #8} to a victim cell as a recommended PRB to be used in EPDCCH transmission. Alternatively, the aggressor cell may transmit coordination information indicating {PRB #0, #1, #4, #7, #8, #9} as a PRB having a relatively small interference. The coordination information may include a PRB list or may be configured in a bitmap form.

At time t1, it is assumed that an aggressor cell does not use PRBs #0, #4, #8 in transmission, a PRB #1 uses low transmission power, and PRBs #2, #3, #5, #6, #7, #9 use high transmission power. The aggressor cell may transmit coordination information indicating {PRB #0, #4, #8} to a victim cell as a recommended PRB to be used in EPDCCH transmission. Alternatively, the aggressor cell may transmit coordination information indicating {PRB #0, #4, #8} as a PRB having a relatively small interference.

At time t2, it is assumed that an aggressor cell does not use PRBs #0, #4, #8 in transmission, PRBs #1, #5, #6 use low transmission power, and PRBs #2, #3, #5, #6, #7, #9 use high transmission power. The aggressor cell may transmit coordination information indicating {PRB #0, #4, #8} to a victim cell as a recommended PRB to be used in EPDCCH transmission. Alternatively, the aggressor cell may transmit coordination information indicating {PRB #0, #1, #4, #5, #6} as a PRB having a relatively small interference.

The victim cell may send to the aggressor cell a message for requesting transmission or update of the coordination information. The victim cell may transmit, to the aggressor cell, information regarding at least any one of a request to change a location and an amount of resources designated by the aggressor cell, suitability for the resources designated by the aggressor cell, whether to utilize the resources designated by the aggressor cell, and a usage frequency of resources designated by the aggressor cell.

Figure 13:
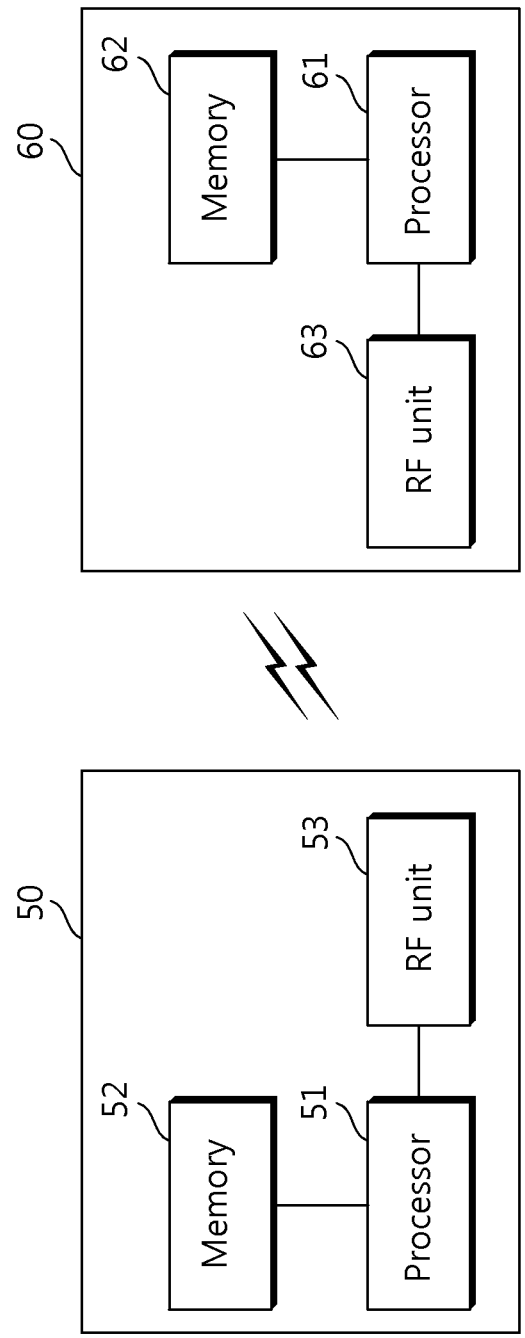
FIG. 13 is a block diagram showing a wireless communication system according to an embodiment of the present invention.

FIG. 13 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, an operation of the BS can be implemented by the processor 51. The processor 51 can configure an EPDCCH search space in one or more PRB pairs, and can transmit an EPDCCH.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiment, an operation of the wireless device can be implemented by the processor 60. The processor 61 can monitor an EPDCCH in an EPDCCH search space.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for coordinating an inter-cell interference in a wireless communication system, the method comprising:

receiving, by a first cell, coordination information related to a configuration of an enhanced physical downlink control channel (EPDCCH) from a second cell, wherein the coordination information includes information on radio resource(s) to be used in transmission of the EPDCCH;

mapping, by the first cell, an EPDCCH transmission resource of the EPDCCH based on the coordination information; and transmitting, by the first cell, the EPDCCH, wherein the coordination information is configured for a plurality of coordinated multipoint user equipment (COMP UE) groups, wherein the EPDCCH transmission resource is mapped so as to avoid at least an EPDCCH collision between the plurality of CoMP UE groups, wherein an indicator is used for indicating a specific mapping rule for mapping the EPDCCH transmission resource, and wherein the coordination information includes information on one or more physical resource blocks (PRBs) in which transmission power used by the second cell is less than or equal to a specific value.

2. The method of claim 1, further comprising:

transmitting, by the first cell, a message for requesting transmission of the coordination information to the second cell.

3. The method of claim 1, further comprising:

transmitting, by the first cell, transmission related information of the EPDCCH to the second cell.

4. The method of claim 3, wherein the transmission related information includes information regarding a physical resource blocks (PRB) in which the EPDCCH is transmitted.

5. A base station in a wireless communication system, the base station comprising:

a radio frequency (RF) circuit configured to transmit and receive a radio signal; and a processor operatively coupled to the RF unit and configured to:

receive coordination information related to a configuration of an enhanced physical downlink control channel (EPDCCH) from a neighboring cell, wherein the coordination information includes information on radio resource(s) to be used in transmission of the EPDCCH;

map an EPDCCH transmission resource of the EPDCCH based on the coordination information; and transmit the EPDCCH, wherein the coordination information is configured for a plurality of coordinated multipoint user equipment (COMP UE) groups, wherein the EPDCCH transmission resource is mapped so as to avoid at least an EPDCCH collision between the plurality of CoMP UE groups, wherein an indicator is used for indicating a specific mapping rule for mapping the EPDCCH transmission resource, and wherein the coordination information includes information on one or more physical resource blocks (PRBs) in which transmission power used by the second cell is less than or equal to a specific value.

6. The base station of claim 5, wherein the processor further configured to transmit a message for requesting transmission of the coordination information to the second cell.

7. The base station of claim 5, wherein the processor further configured to transmit transmission related information of the EPDCCH to the second cell.

8. The base station of claim 7, wherein the transmission related information includes information regarding a physical resource blocks (PRB) in which the EPDCCH is transmitted.

* * * * *